Feb. 28, 1939.  A. J. WEATHERHEAD, JR., ET AL   2,149,078
METHOD OF MAKING BRAKE CYLINDERS
Filed Jan. 25, 1935   2 Sheets-Sheet 1

Inventors
ALBERT J. WEATHERHEAD JR.
& KARL C. SCHOEPFLE
By
Attorneys

Feb. 28, 1939.  A. J. WEATHERHEAD, JR., ET AL  2,149,078
METHOD OF MAKING BRAKE CYLINDERS
Filed Jan. 25, 1935  2 Sheets-Sheet 2

Inventors
ALBERT J. WEATHERHEAD JR.
& KARL C. SCHOEPFLE
Attorneys

Patented Feb. 28, 1939

2,149,078

UNITED STATES PATENT OFFICE 2,149,078

METHOD OF MAKING BRAKE CYLINDERS

Albert J. Weatherhead, Jr., Cleveland, and Karl C. Schoepfle, Cleveland Heights, Ohio, assignors to The Weatherhead Company, Cleveland, Ohio, a corporation of Ohio Application January 25, 1935, Serial No. 3,484

5 Claims. (Cl. 29—152.1)

This invention relates to hydraulic brakes for vehicles, and more particularly to methods of making the wheel cylinder assemblies of hydraulic brakes.

The method of manufacture heretofore employed to make and mount the wheel cylinders for hydraulic brakes has involved the production of a heavy casting and extensive machining operations to reduce the casting to proper size. The improvements effected in hydraulic brakes by the provision of a different size cylinder for each brake shoe has increased the cost of the casting and machining operations and the difficulty in mounting the casting in the brake assembly.

It is among the objects of our invention to provide a method of making an hydraulic brake cylinder assembly that is strong, light in weight, economical in manufacture, and which can be produced at low cost with a small number of machining operations. Another object of our invention is to provide a method of making a brake cylinder assembly wherein the cylinders have surfaces especially formed for convenient attachment to fluid conducting and supporting means.

Another object of our invention is to provide a method of making a brake cylinder assembly whereby the fluid conducting and supporting devices can be produced from bar stock with a minimum amount of machining, and can readily be secured to the cylinders by a welding or brazing operation.

It is a further object of our invention to provide a method of making brake cylinder assemblies wherein the fluid connections to the cylinders also function to support the cylinders in the assembly. It is a further object of our invention to effect the attachment of the fluid connection fittings to the cylinder simultaneously with the joining of the two cylinders to each other.

Other objects, relating to details of construction and economies of manufacture, will appear hereinafter, reference being made to the accompanying drawings which illustrate preferred embodiments of the invention.

Figure 1:
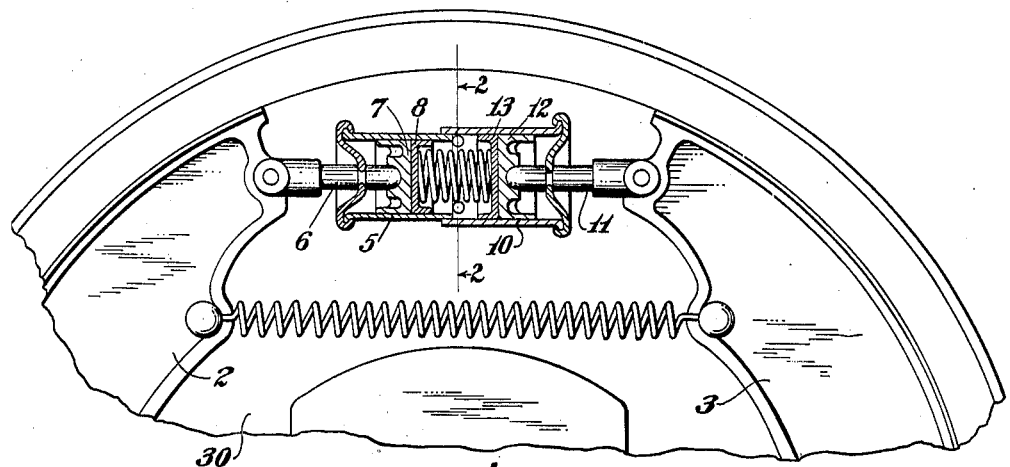
Figure 2:
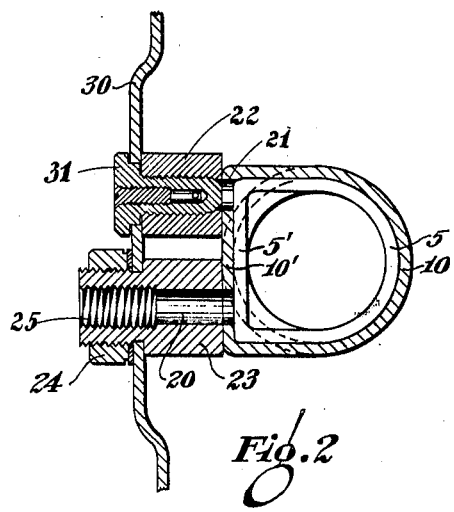
Figure 3:
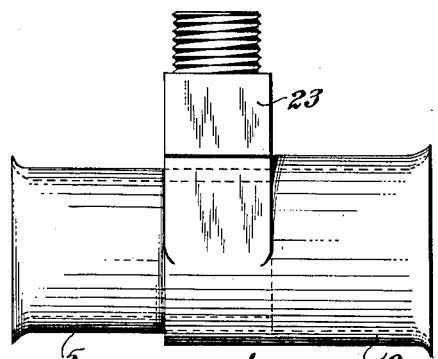
Figure 5:
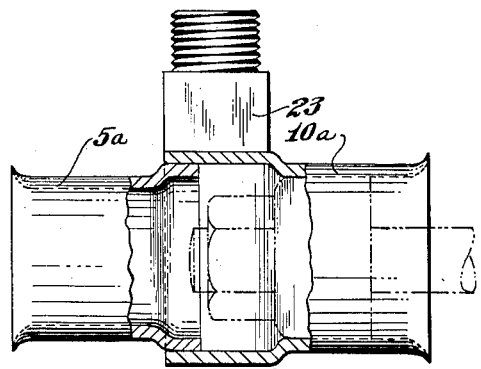
Figure 6:
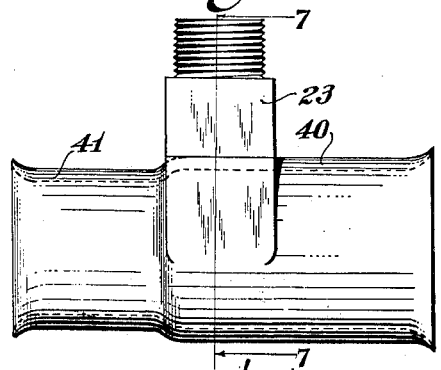
Figure 7:
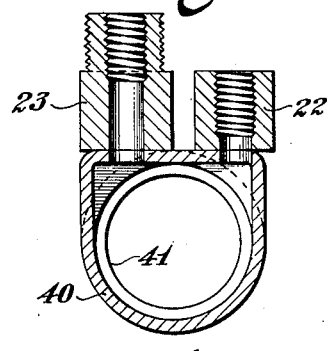
Figure 4:
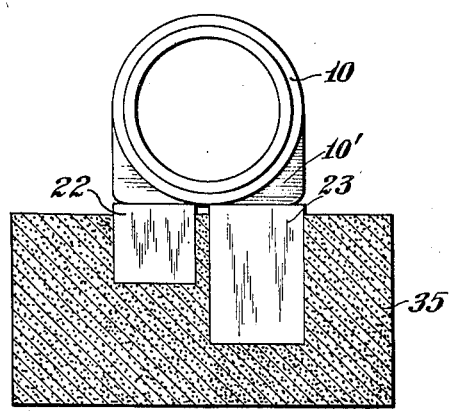

Figure 1 is an elevation of the brake cylinder assembly in place in a conventional hydraulic brake, parts of the brake mechanism being omitted; Figure 2 is a section taken on the line 2—2 of Figure 1; Figure 3 is a plan view of the brake cylinder assembly showing the contour of the cylinder sections; Figure 4 shows the supporting member and cylinder assembly as positioned for brazing; Figure 5 is an elevation with parts in section of a modified form of the brake cylinder assembly; Figure 6 shows a further modification of the brake cylinder assembly; and Figure 7 is a sectional view of the modification shown in Figure 6 taken on the line 7—7.

As shown in Figure 1 of the drawings, the cylinders 5 and 10, when assembled on the brake backing plate 30, extend in opposite directions toward the pivoted brake shoes 2 and 3 carried by said back plate 30. Pistons 7 and 13 provided with connecting rods 6 and 11 respectively are arranged within the cylinders and are moved therein to actuate the brake shoes 2 and 3 in the usual manner. As will be understood by those skilled in the art, cylinders of different diameters may be employed to compensate for the self-energizing effect of the leading brake shoe. The pistons 7 and 13 may be provided with the usual flexible cup washers 8 and 13 to retain the fluid in the cylinders and otherwise function in the usual manner. The cylinders are supported on the backing plate by the member 23 and nut 24. The member 23 is provided with a passageway 20 for supplying actuating fluid, the passageway being provided with suitable means such as the internal threads 25 for connection to a flexible hose or other fluid supply conduit. Air may be bled from the cylinders through the passageway 21 in the member 22, the passageway being normally closed by a plug 31 of ordinary construction.

The cylinders 5 and 10 of Figures 1 to 4 may conveniently be formed of seamless metal tubing stock or the cylinders may be drawn individually in cup-shape and the bottoms of the cups removed to provide the cylinders. The outer ends of the cylinders are preferably slightly flared, as shown, to facilitate the attachment of the rubber dust caps usually employed in hydraulic brakes. The cylinders 5 and 10 are preferably formed of steel and are proportioned to telescope one within the other at one end. An advantageous feature of our method of producing brake cylinder assemblies is found in the fact that the differences in the diameter of the cylinders required to produce different braking effects may be utilized to accomplish the telescoping of the parts.

In order to provide a convenient surface for mounting the members 22 and 23, the cylinders 5 and 10 throughout their telescoping portions are formed to provide a flat side as at 5' and 10' in Figure 2. The flat side at the junction of the two cylinders forms, in effect, a fluid inlet chamber between the cylinders which opens into each of the cylinders. The outer side of the flat wall of the inlet chamber is especially suited for the mounting of the members 22 and 23 by a method of welding or brazing more fully described hereinafter.

The vent block 22 and fluid connection and supporting member 23 are mounted on the flat outer surface of the cylinder and these parts may conveniently be produced by cutting off sections of bar stock of the proper length. The members may be of round, square or other suitable cross-section. The passageways or conduits 20 and 21 may be drilled and threaded either before or after assembly with the cylinders, but we preferably perform these machine operations after assembly in order to assure proper alignment of the passageways with the openings in the cylinder walls. In order to prevent any entrapment of air in the chamber between the cylinders and to facilitate the removal of air therein, the cylinder 5 terminates short of the aperture formed in cylinder 10 by the bore 21. The bore 21 being tangential to the larger cylinder 10 at the top thereof is positioned at the highest point in the fluid chamber. The cylinder 10 is longer than the cylinder 5 to extend the full length of the inlet chamber, whereas the cylinder 5 telescopes therein sufficiently to form a strong fluid tight bond and clear the air vent 21.

We preferably form the cylinders and members 21 and 22 into a strong unitary structure by means of a welding or brazing operation which produces a strong, leak-proof alloy bond between the contacting surfaces of the various parts. In carrying out the assembly operation, the two sections 5 and 10 may be telescoped together with a light press fit and the blocks 22 and 23 positioned adjacent the outer flat side 10' of the outer cylinder shell 10, and the cylinders and blocks thus arranged are supported as shown in Figure 4 in a suitably recessed supporting block 35 made of carbon or other suitable heat resisting material. Copper or copper alloy is supplied to the above described assembly of parts in any convenient form, for instance the parts may be coated with a lacquer containing copper powder in suspension, the parts may be copper plated or copper wire may be wrapped adjacent those sections of the assembly to be joined by brazing. The assembly on the block 35 is then placed in a furnace wherein the atmosphere is controlled to affect the best brazing of the parts. The usual atmosphere maintained may comprise hydrogen or a mixture of nitrogen, hydrogen, carbon dioxide and carbon monoxide, produced from natural gas and air, the proportions of these ingredients varying with the mixture of natural gas and air being used. At a temperature of about 2100° F. the copper becomes fluid and flows by capillary attraction into the joints either upward, downward or laterally. The melted copper also combines with the adjacent iron or steel surfaces to form a copper iron alloy. Although this alloy is very thin, the fusion affected gives a strength and uniformity of joint which cannot be obtained in any other way. The reducing atmosphere of the furnace in addition to preventing the oxidation of the copper cleans and brightens the entire assembly and thus obviates further cleaning.

The parts 10, 22 and 23 are provided with the fluid conduits 21 and 21 preferably after the brazing operation. After the parts are brazed, the bores 20 and 21 may be economically produced by drilling through the members 22 and 23 and flat side wall of the cylinder 10 in a single operation. This also prevents any eccentricity or mis-alignment of the holes in the blocks and inlet chamber. The bore 21 in the member 22 may be internally tapped for the screw plug 31 and the member 23 may be both internally and externally threaded to accommodate the fluid hose connection and the securing nut 24. The cylinders are mounted on the backing plate 30 as best shown in Figure 2 and the nut 24 drawn up to clamp the shoulders 24a against the backing plate. The backing plate 30 is apertured adjacent the plug 31 to render the bleeding plug 31 accessible and the plug further functions to prevent rotation of the cylinder assembly with relation to the backing plate.

The modified form of cylinder assembly illustrated in Figure 5 is especially suited for an assembly wherein the cylinders require a broaching, reaming or other finishing operations to properly fit the pistons. In this form of our invention the least diameter of the fluid inlet chamber formed between the cylinders 5a and 10a is greater than the diameter of either of the cylinders. The enlargement of the inlet chamber accommodates the head portion of a finishing tool shown in dotted lines. In other respects the structure shown in this modification and the method of making same is substantially as heretofore described in connection with the first embodiment.

In Figures 6 and 7 we have illustrated a modification wherein the two cylinders are formed from a single section of tubing. The tube is reduced throughout a part of its length to form the cylinders 40 and 41. The fluid inlet chamber in this form of our invention is formed by flattening one side of the tubular section to provide a chamber having a D-shaped cross section. The members 23 and 22 are brazed to the outer face of the flat side of the inlet chamber and the procedure followed in making this form of cylinder assembly is similar to that described in connection with the other two embodiments.

From the foregoing it will be observed that the cylinders are given substantially their final form by drawing operations and are secured to each other and to the fluid connectors in a single brazing operation. By reason of the configuration of the cylinders, the fluid connector members can be made rapidly and economically from bar stock. The brazing operation employed functions to form a fluid tight joint as well as securely bonding the parts together and cleaning the finished article. The connector 23 functions to secure the assembly to the backing plate and thus by a novel form and assembly of parts and the operations performed upon the parts we have combined their functions in a manner to produce a stronger and more economical cylinder assembly than heretofore employed in this art.

Although we have described the preferred embodiments of our invention in considerable detail, it is to be understood that modifications and rearrangements may be made without departing from the spirit and scope of the invention as defined in the following claims.

We claim:

1. The method of forming a brake cylinder assembly which comprises forming a metal tube of substantially uniform wall thickness to provide a pair of oppositely extending cylinders, flattening the intermediate portion of the tube on one side by deforming the side wall thereof, securing an assembly-support to the outer wall of said flat side by a fluid tight alloy bond and drilling a conduit in said support and flattened tube portion within the area of said fluid tight bond.

2. The method of forming a brake cylinder which comprises the drawing of a pair of metal cylinders of substantially uniform wall thickness, deforming the wall adjacent one end of each of said cylinders to present a flat side, telescoping the said ends of said cylinders together and bonding the cylinders to each other throughout their engaging portions by brazing in a controlled atmosphere.

3. The method of forming a brake cylinder assembly which comprises the drawing of a pair of metal cylinders of different diameters, each cylinder having walls of substantially uniform thickness, shaping one end of each of said cylinders into substantially D-shape in cross-section, telescoping said D-shaped ends together, arranging support means adjacent the flat side of said D-shaped portion and bonding said cylinders and means into a unitary structure by brazing in a controlled atmosphere.

4. The method of forming a brake cylinder assembly which comprises the drawing of a pair of steel tube members of unequal diameters, each member having walls of substantially uniform thickness, shaping one end of each of said cylinders to present a D-shaped cross section, telescoping said D-shaped ends one within the other to effect a co-axial alignment of the cylinders, placing metallic blocks in a recessed support and arranging said D-shaped portion of said cylinders adjacent said blocks, supplying copper adjacent the engaging faces of said blocks and cylinders and brazing the assembly.

5. The method of making a brake cylinder assembly which comprises forming a metal tube having a reduced diameter throughout a portion of its length to produce cylinders of different diameters and of substantially uniform wall thickness throughout, flattening a part of at least one of said cylinders while substantially maintaining the uniform wall thickness thereof and permanently securing a support to the outer wall of said flattened part by a metallic bond.

ALBERT J. WEATHERHEAD, Jr.
KARL C. SCHOEPFLE.